US012698424B2

(12) United States Patent
Wu et al.

(10) Patent No.: US 12,698,424 B2
(45) Date of Patent: Aug. 4, 2026

(54) CURRENT COLLECTOR PROTECTIVE GLUE

(71) Applicant: APh ePower Co., Ltd., Kaohsiung City (TW)

(72) Inventors: Jui-Hsuan Wu, Kaohsiung City (TW); Shih Po Ta Tsai, Kaohsiung City (TW); Wei Chen Huang, Tainan City (TW); Chih-Yu Yang, Kaohsiung City (TW)

(73) Assignee: APh ePower Co., Ltd., Kaohsiung City (TW)

( * ) Notice: Subject to any disclaimer, the term of this patent is extended or adjusted under 35 U.S.C. 154(b) by 631 days.

(21) Appl. No.: 17/982,533

(22) Filed: Nov. 8, 2022

(65) Prior Publication Data

US 2023/0174832 A1      Jun. 8, 2023

(30) Foreign Application Priority Data

Dec. 6, 2021    (TW) ................................. 110145487

(51) Int. Cl.
*C09J 101/02*        (2006.01)
*C09J 109/02*        (2006.01)
*C09J 109/06*        (2006.01)
*C09J 133/02*        (2006.01)

(52) U.S. Cl.
CPC ........... *C09J 101/02* (2013.01); *C09J 109/02* (2013.01); *C09J 109/06* (2013.01); *C09J 133/02* (2013.01)

(58) Field of Classification Search
CPC ...... C09J 101/02; C09J 109/02; C09J 109/06; C09J 133/02; C09J 11/00; Y02E 60/10; H01M 50/586; H01M 50/59; C09D 109/02; C09D 109/06; C08L 1/00; C08L 33/02
See application file for complete search history.

(56) References Cited

U.S. PATENT DOCUMENTS

| | | | | |
|---|---|---|---|---|
| 3,965,060 | A | * | 6/1976 | Lakshmanan .......... C09J 145/02 524/505 |
| 4,768,523 | A | * | 9/1988 | Cahalan ................. C09J 141/00 607/116 |
| 5,346,957 | A | * | 9/1994 | Tsuji ...................... C09J 163/00 525/122 |
| 5,677,368 | A | * | 10/1997 | Dunn ...................... C08C 1/075 523/335 |
| 9,755,213 | B2 | * | 9/2017 | Huh .................... H01M 50/531 |
| 11,367,876 | B2 | | 6/2022 | Han |
| 2007/0287064 | A1 | * | 12/2007 | Suzuki .................. H01M 4/622 252/182.1 |
| 2009/0291360 | A1 | * | 11/2009 | Kim .................... H01M 50/449 429/144 |
| 2019/0157681 | A1 | * | 5/2019 | Ho ......................... H01M 4/621 |
| 2021/0095166 | A1 | * | 4/2021 | Seth ........................... C09J 7/26 |

FOREIGN PATENT DOCUMENTS

| | | |
|---|---|---|
| CN | 101894937 | 11/2010 |
| CN | 103545530 | 1/2014 |
| CN | 107170991 | 9/2017 |
| CN | 111403751 | 7/2020 |
| CN | 111916645 | 11/2020 |
| KR | 20160125720 A | 11/2016 |
| WO | 2018107743 | 6/2018 |

OTHER PUBLICATIONS

Ralf Diehm et al., "High-Speed Coating of Primer Layer for Li-Ion Battery Electrodes by Using Slot-Die Coating", Energy Technology, Jul. 2, 2020, pp. 2000259 (1)-2000259 (8), vol. 8.
"Search Report of Europe Counterpart Application", issued on Apr. 13, 2023, p. 1-p. 8.
"Office Action of China Counterpart Application", issued on Apr. 17, 2025, p. 1-p. 6.

* cited by examiner

*Primary Examiner* — Doris L Lee
(74) *Attorney, Agent, or Firm* — JCIPRNET

(57)      ABSTRACT
A current collector protective glue includes a solvent and an adhesive. The solvent is selected from one or more of water, ethanol, NMP, acetone, and butanone. The adhesive is selected from one or more of cellulose, polyacrylic acid, styrene-butadiene rubber, styrene butadiene rubber, and nitrile rubber.

5 Claims, No Drawings

CURRENT COLLECTOR PROTECTIVE GLUE

CROSS-REFERENCE TO RELATED APPLICATION

This application claims the priority benefit of Taiwan application serial no. 110145487, filed on Dec. 6, 2021. The entirety of the above-mentioned patent application is hereby incorporated by reference herein and made a part of this specification.

BACKGROUND

Technical Field

The disclosure relates to a protective glue, and more particularly, to a current collector protective glue.

Description of Related Art

Generally speaking, a protective tape is usually attached to a current collector in an electric core to protect the current collector. However, this method has poor coverage and is difficult to completely cover, and an adhesive of the tape itself is also prone to side reactions with the electrolyte, causing issues such as the open circuit or short circuit of the current collector, which will adversely affect the service life and performance of the electric core.

SUMMARY

The disclosure provides a current collector protective glue, which may improve service life and performance of an electric core.

A current collector protective glue in the disclosure includes a solvent and an adhesive. The solvent is selected from one or more of water, ethanol, 1-Methyl-2-pyrrolidone, acetone, and butanone. The adhesive is selected from one or more of cellulose, polyacrylic acid, styrene-butadiene rubber, styrene butadiene rubber, and nitrile rubber.

In an embodiment of the disclosure, a weight percentage of the solvent in the current collector protective glue ranges from 30% to 95%.

In an embodiment of the disclosure, a weight percentage of the adhesive in the current collector protective glue ranges from 5% to 70%.

In an embodiment of the disclosure, the current collector protective glue is formed by liquid heating and curing.

In an embodiment of the disclosure, the current collector protective glue is not in a form of a sheet.

In an embodiment of the disclosure, the current collector protective glue is a non-attached tape.

In an embodiment of the disclosure, a weight percentage of the adhesive in the current collector protective glue is greater than a weight percentage of the solvent in the current collector protective glue.

In an embodiment of the disclosure, the current collector protective glue is an insulating material.

In an embodiment of the disclosure, a resistance value of the current collector protective glue is at least greater than $10^9$ ohm/meter.

In an embodiment of the disclosure, the current collector protective glue is only formed by the solvent and the adhesive.

Based on the above, the current collector protective glue in the disclosure is selected by the material, that is, the current collector protective glue includes the solvent and the adhesive. The solvent is selected from one or more of water, ethanol, 1-Methyl-2-pyrrolidone, acetone, and butanone, while the adhesive is selected from one or more of cellulose, polyacrylic acid, styrene-butadiene rubber, styrene butadiene rubber, and nitrile rubber. In this way, the current collector protective glue may cover the current collector more completely to reduce the probability of side reactions, effectively protect the current collector, and avoid the current collector from contacting the electrolyte and not participating in the electric core reaction. Therefore, the service life and performance of the electric core may be improved.

In order for the aforementioned features and advantages of the disclosure to be more comprehensible, embodiments accompanied with drawings are described in detail below.

DETAILED DESCRIPTION OF DISCLOSED EMBODIMENTS

Hereinafter, embodiments of the disclosure are described in detail. However, the embodiments are exemplary. The disclosure is not limited thereto, and the disclosure is defined by the scope of the claims.

A current collector protective glue in this embodiment is selected by a material, that is, the current collector protective glue includes a solvent and an adhesive. The solvent is selected from one or more of water, ethanol, 1-Methyl-2-pyrrolidone, acetone, and butanone, while the adhesive is selected from one or more of cellulose, polyacrylic acid, styrene-butadiene rubber, styrene butadiene rubber, and nitrile rubber. In this way, the current collector protective glue may cover a current collector (such as a pole tab and a pole lug) to reduce the probability of side reactions, effectively protect the current collector, and avoid the current collector from contacting electrolyte and not participating in an electric core reaction. Therefore, service life and performance of an electric core may be improved. It should be noted that as long as the solvent and the adhesive are selected from at least one of the above categories, the solvent and the adhesive fall within the scope of the disclosure.

Further, the side reaction may be a corrosion reaction in which the electrolyte in the electric core corrodes the current collector (such as metal). Therefore, when the side reaction occurs, the current collector protective glue will be destroyed or even dissolved, thereby reducing protective efficacy of the current collector protective glue. In this embodiment, since the selected material of the adhesive is substantially not corroded by the electrolyte, the probability of side reactions may be reduced to effectively protect the current collector and avoid the current collector from contacting the electrolyte and not participating in the electric core reaction. Therefore, the service life and performance of the electric core may be improved.

In some embodiments, a weight percentage of the solvent in the current collector protective glue ranges from 30% to 95%. For example, the weight percentage of the solvent in the current collector protective glue may be 30%, 40%, 50%, 60%, 70%, 80%, 90%, 95%, or any value from 30% to 95%. A weight percentage of the adhesive in the current collector protective glue ranges from 5% to 70%. For example, the weight percentage of the adhesive in the current collector protective glue may be 5%, 10%, 20%, 30%, 40%, 50%, 60%, 70% or any value from 5% to 70%. However, the disclosure is not limited thereto.

In some embodiments, the current collector protective glue may be formed by liquid heating and curing. In other words, the current collector protective glue may be first coated, adhered, or poured on the current collector in a liquid form to completely cover the current collector. Next, heating is performed to cure a liquid material to form a thin film. Therefore, the current collector protective glue in this embodiment is not in a form of a sheet. For example, the current collector protective glue in this embodiment is a non-attached tape. However, the disclosure is not limited thereto.

In some embodiments, the weight percentage of the solvent in the current collector protective glue and the weight percentage of the adhesive in the current collector protective glue are optionally designed. For example, the weight percentage of the adhesive in the current collector protective glue is greater than the weight percentage of the solvent in the current collector protective glue. Therefore, fluidity of the uncured liquid current collector protective glue may be reduced to reduce difficulties in operation. However, the disclosure is not limited thereto. The weight percentage of the adhesive in the current collector protective glue and a weight percentage of the current collector protective glue may depend on actual design requirements.

In some embodiments, the current collector protective glue is an insulating material to avoid short circuit caused by the current collector protective glue due to conduction. For example, a resistance value of the current collector protective glue is at least greater than $10^9$ ohm/meter ($\Omega/m$). However, the disclosure is not limited thereto.

In some embodiments, the current collector protective glue is only formed by the solvent and the adhesive. In other words, the current collector protective glue may substantially not have additives other than the solvent and the adhesive, but the disclosure is not limited thereto.

In some embodiments, the current collector protective glue may be matched in the following combinations, as shown in Table 1.

TABLE 1

| Combinations | Solvent | Adhesive |
|---|---|---|
| 1 | water | cellulose, styrene butadiene rubber |
| 2 | water, 1-Methyl-2-pyrrolidone | polyacrylic acid, styrene butadiene rubber |
| 3 | ethanol, 1-Methyl-2-pyrrolidone | cellulose, polyacrylic acid, nitrile rubber |
| 4 | 1-Methyl-2-pyrrolidone, butanone | cellulose, polyacrylic acid, styrene-butadiene rubber |

It should be noted that the above combinations are only exemplary, and the current collector protective glue in the disclosure may be arbitrarily combined with the above solvent and adhesive in a suitable ratio, as long as the current collector protective glue includes at least one solvent and at least one adhesive. It falls within the scope of the disclosure that the solvent is selected from one or more of water, ethanol, 1-Methyl-2-pyrrolidone, acetone, and butanone, and the adhesive is selected from one or more of cellulose, polyacrylic acid, styrene-butadiene rubber, styrene butadiene rubber, and nitrile rubber.

Based on the above, the current collector protective glue in the disclosure is selected by the material, that is, the current collector protective glue includes the solvent and the adhesive. The solvent is selected from one or more of water, ethanol, 1-Methyl-2-pyrrolidone, acetone, and butanone, while the adhesive is selected from one or more of cellulose, polyacrylic acid, styrene-butadiene rubber, styrene butadiene rubber, and nitrile rubber. In this way, the current collector protective glue may cover the current collector more completely to reduce the probability of side reactions, effectively protect the current collector, and avoid the current collector from contacting the electrolyte and not participating in the electric core reaction. Therefore, the service life and performance of the electric core may be improved.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A current collector protective glue, comprising:
   a solvent, wherein the solvent is one or more selected from the group consisting of water, ethanol, 1-Methyl-2-pyrrolidone, acetone, and butanone; and
   an adhesive, wherein the adhesive consists of cellulose, polyacrylic acid and nitrile rubber, and the current collector protective glue is only formed by the solvent and the adhesive.

2. The current collector protective glue according to claim 1, wherein a weight percentage of the solvent in the current collector protective glue ranges from 30% to 95%.

3. The current collector protective glue according to claim 1, wherein a weight percentage of the adhesive in the current collector protective glue ranges from 5% to 70%.

4. The current collector protective glue according to claim 1, wherein the current collector protective glue is not in a form of a sheet.

5. The current collector protective glue according to claim 1, wherein a weight percentage of the adhesive in the current collector protective glue is greater than a weight percentage of the solvent in the current collector protective glue.

* * * * *